United States Patent [19]

Herbst et al.

[11] 4,338,515
[45] Jul. 6, 1982

[54] ANALOG-DIGITAL CONVERTER FOR THE EVALUATION OF THE OUTPUT SIGNAL OF AN OPTOELECTRONIC SENSOR ELEMENT

[75] Inventors: Heiner Herbst, Munich; Hans-Jörg Pfleiderer, Zorneding, both of Fed. Rep. of Germany

[73] Assignee: Siemens Aktiengesellschaft, Berlin & Munich, Fed. Rep. of Germany

[21] Appl. No.: 168,647

[22] Filed: Jul. 11, 1980

[30] Foreign Application Priority Data

Sep. 10, 1979 [DE] Fed. Rep. of Germany ....... 2936492

[51] Int. Cl.³ .............................................. H01J 40/14
[52] U.S. Cl. .................................. 250/214 R; 307/311
[58] Field of Search ............... 356/1; 250/578, 214 R; 354/25; 307/311

[56] References Cited
PUBLICATIONS

Prospectus 77144 of Reticon Corp., Sunnyvale, Calif. .

Primary Examiner—David C. Nelms
Assistant Examiner—Darwin R. Hostetter
Attorney, Agent, or Firm—Hill, Van Santen, Steadman, Chiara & Simpson

[57] ABSTRACT

An analog-digital converter is disclosed which monitors an output signal of an optoelectronic sensor element for the attainment or non-attainment of a reference charge, whereupon switchover occurs from one logic signal to the other. An exclusion to a large extent of parameter or characteristic tolerance effects on the result of the evaluation is achieved. For this purpose, the converter contains an inverter, the input of which is connected via a reset transistor with a constant voltage source and which is connected via a potential barrier defining transistor with the output of the sensor element. The converter shows no dependence upon fluctuations of the inverter. Applications include distance measuring devices, and photographic and electronic cameras.

12 Claims, 6 Drawing Figures

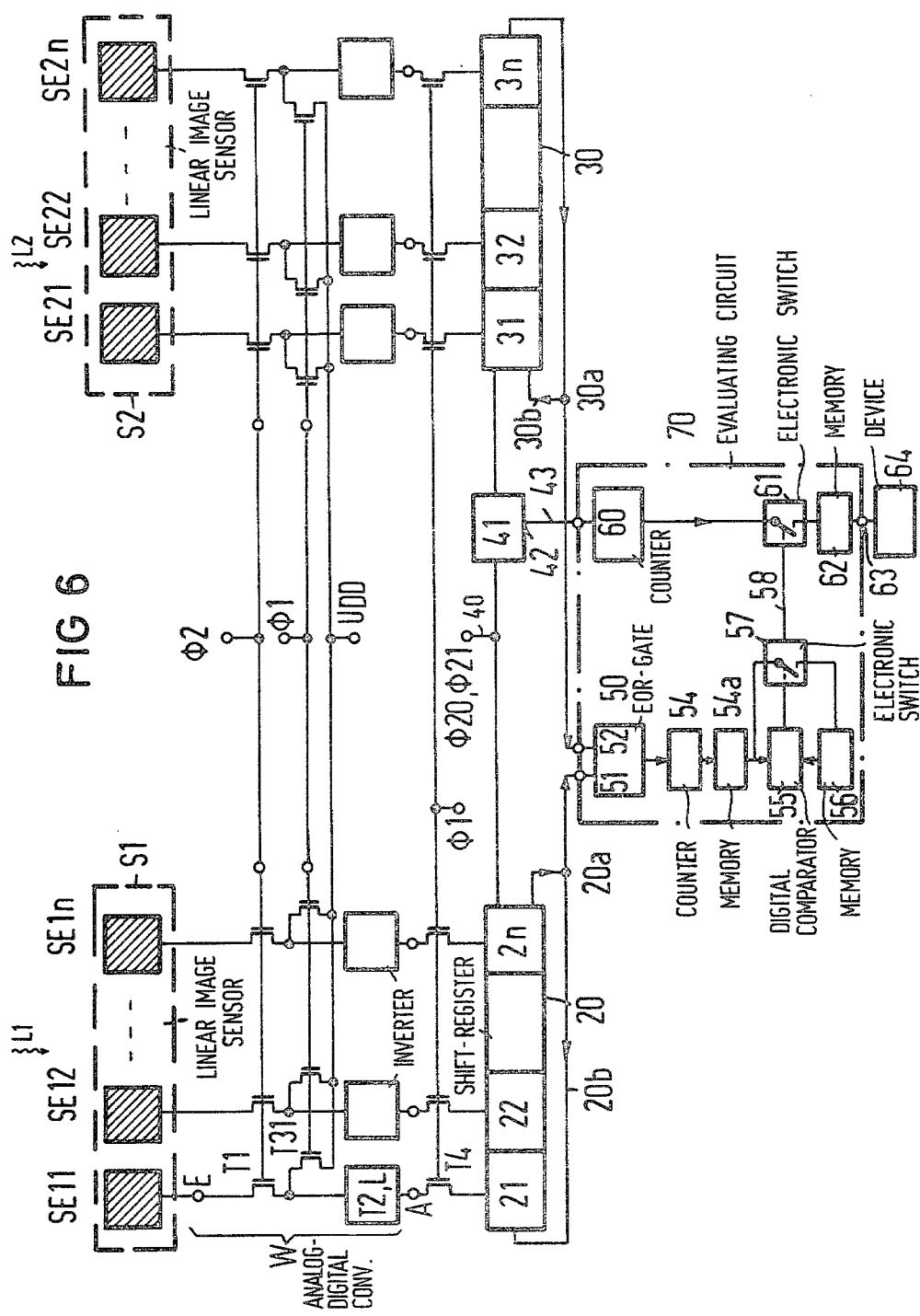

4,338,515

ANALOG-DIGITAL CONVERTER FOR THE EVALUATION OF THE OUTPUT SIGNAL OF AN OPTOELECTRONIC SENSOR ELEMENT

BACKGROUND OF THE INVENTION

The invention concerns an analog-digital converter for the evaluation of the output signal of an optoelectronic sensor element wherein an inverter is provided having a switching transistor with a series connected load element, and a further transistor is provided which connects the sensor element to an input of the inverter.

Such an analog-digital converter is described in German patent application No. P 2,838,647.2 corresponding to U.S. application Ser. No. 069,788. It there consists of a converter, the input of which is connected on the one side via a series connection of two switching transistors with a supply voltage source, and on the other side via a third switching transistor with the output of an optoelectronic sensor element. When the charge which is optically generated in the sensor element within an integration time determined by the third switching transistor has attained a predetermined reference value, then the converter proceeds into a switching state in which at its output, a logic signal "1" can be obtained. In the case of non-attainment of the reference value, the converter remains in a state in which the logic output signal "0" is present. The converter and one of the two switching transistors which lie in series represent circuit parts of a shift register stage which is individually associated with the sensor element. An analog digital converter for the evaluation of the analog output signals of a linear image sensor is further referred to in the prospectus 77144 of the firm Reticon Corp., Sunnyvale, Calif., wherein the "Model LC 600 Digital Line Scan Camera" is specified. If one of the output signals of the consecutively scanned or interrogated sensor elements exceeds a predetermined threshold value, then a logic "1" is released via the converter. The next following output signal of a sensor element which does not attain the threshold value, on the other hand, results in the switchover of the converter to an output signal which corresponds to a logic "0."

SUMMARY OF THE INVENTION

An object of the invention is to provide an analog-digital converter of the kind described above which permits a very precise digitalization of the analog sensor signals to a large extent independently of parameter fluctuations of the converter established by the manufacturer. This problem is solved in the analog-digital converter system of the invention, by connecting the inverter input with a reset transistor which connects to a constant voltage. The transistor connecting the sensor element with the input of the inverter is designed as a transistor defining a potential barrier.

An advantage which is attainable with the invention is that parameter or characteristic tolerances of the converter do not influence the digitalization. Also tolerances of the cutoff voltage of the potential barrier defining transistor are compensated to a large extent since this transistor is part of a circuit for resetting the sensor element as well as a part of a circuit for the digital evaluation of the analog sensor signal.

BRIEF DESCRIPTION OF THE DRAWINGS

FIG. 6 shows a schematic representation of a circuit in which the analog-digital converter according to the invention is employed.

DESCRIPTION OF THE PREFERRED EMBODIMENTS

Figure 1:
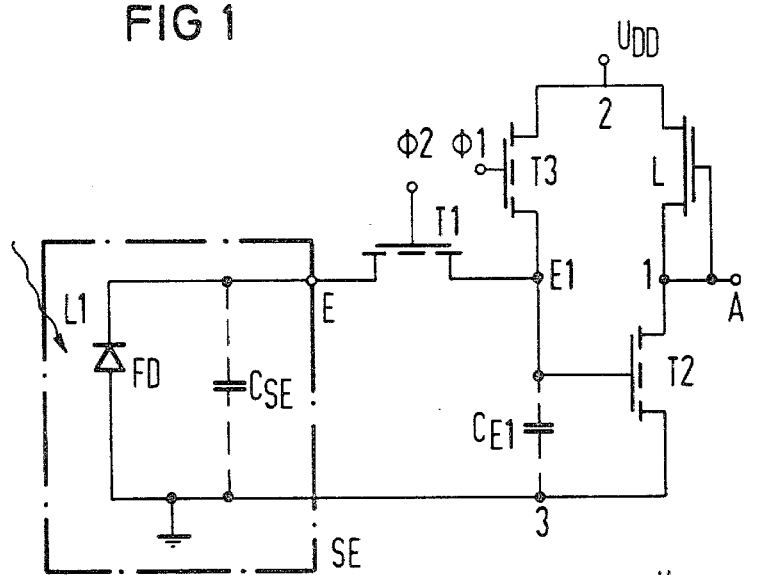
FIG. 1 illustrates a circuit diagram of a preferred embodiment of the analog-digital converter of the invention.

FIG. 1 shows the principal circuit of an analog-digital converter which is connected with its input (circuit point E) to the output of an optoelectronic sensor element SE. In series with the input E is a source-drain path of a field effect transistor T1, via which input E is connected with the input E1 of an inverter. This consists of the series connection of a switching transistor T2 and a load element L, which in FIG. 1 is represented as a field effect transistor of the depletion type, the gate of which is connected with circuit point 1. The latter is connected to the output A of the analog-digital converter, whereas the terminal-side leads 2 and 3 of the series circuit T2, L are connected to a constant voltage $U_{DD}$ and a reference potential, for example, ground. Between points 2 and E1 is the source-drain path of a field effect transistor T3. This represents a reset transistor, the gate of which, for purposes of resetting circuit points E1 and E, is provided with a set potential with a clock pulse voltage $\phi 1$. The field effect transistor T1 represents a potential barrier defining transistor, the gate of which is provided with a pulse voltage $\phi 2$.

The sensor element consists of a photodiode FD which is parallel to the sensor output E, the capacitance of which is designated $C_{SE}$. The input capacitance of the inverter T2, L, which is measured at circuit point E1, is drawn in FIG. 1 with a broken line and is provided with the reference symbol $C_{E1}$.

Figure 2:
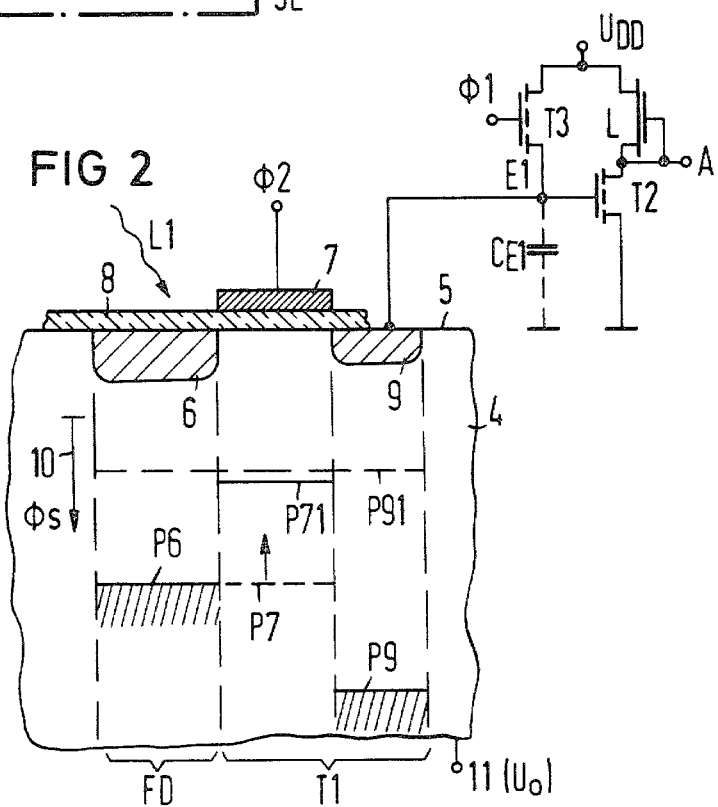
FIG. 2 shows the design of a circuit portion of FIG. 1.

FIG. 2 shows a design of the converter whereby a circuit portion of FIG. 1 which contains the photodiode is integrated on a semiconductor body 4 of a first conductivity type, which consists for example of p-doped silicon. The photodiode FD consists of a region 6 of a conductivity type which is opposed to the first, and which is arranged at the interface 5 of the semiconductor body 4. The region of the semiconductor body 4 which is adjacent to region 6 is covered by a gate 7, which is separated from the interface 5 by means of a thin insulating layer 8, for example of SiO$_2$. The gate 7 together with a drain region 9 of a conductivity type which is opposed to the first forms the field effect transistor T1. The region 9 simultaneously represents input E1 of the inverter T2, L, and especially also represents the source region of the reset transistor T3. The circuit parts T2, L and T3 are represented in correspondence to FIG. 1. The input capacitance $C_{E1}$ of the inverter is indicated in the same manner as in the case of FIG. 1. In operation, the circuit points E1 and E are first reset to high positive potentials. This occurs by means of a clockpulse $\phi 1$ and a pulse $\phi 2$ (FIG. 3), which begin at time t1 and which switch the reset transistor T3 and the transistor T1 in each case into the conducting state. The amplitude of $\phi 2$ is smaller than that of $\phi 1$, so that the transistor T1 is operated in the saturation region, for which the relationship $U_{E1} - U_E$ is greater than $A_{\phi 2} - U_T - U_E$ applies. Accordingly, the voltages $U_{E1}$ and $U_E$ in each case appear at the circuit points E1 and E, while $A_{\phi 2}$ signifies the amplitude of the pulse $\phi 2$, and $U_T$ signifies the cutoff voltage of transistor T1. In this case, the voltage $U_E$ is set by means of $A_{\phi 2}$, for which the relationship $U_E = A_{\phi 2} - U_T$ applies.

Under the influence of the voltages $U_E$, $\phi 2$ and $U_{E1}$ which during the resetting are at region 6, the gate 7 and the region 9, in each case potential values P6, P7 and P9 of the surface potential $\phi_S$ are set. In FIG. 2 these are drawn in the direction of arrow 10. Accordingly, the upper end of 10 represents the reference potential $P_0$, on which is located semiconductor body 4 in the case of supplying of a substrate voltage $U_0$ via lead 11.

Following this, $A_{\phi 2}$ is lowered to a smaller value $A1_{\phi 2}$, which lies between $U_E$ and the substrate voltage $U_0$. If $A1_{\phi 2}$ lies below the voltage $U_E + U_T$, then the transistor T1 blocks, whereby below the electrode 7 a potential barrier P71 forms. The potentials P6 and P9 remain uninfluenced by this, so that the curve P6, P71 and P9, which was also drawn in FIG. 2, results in $\phi_S$.

Figure 3:
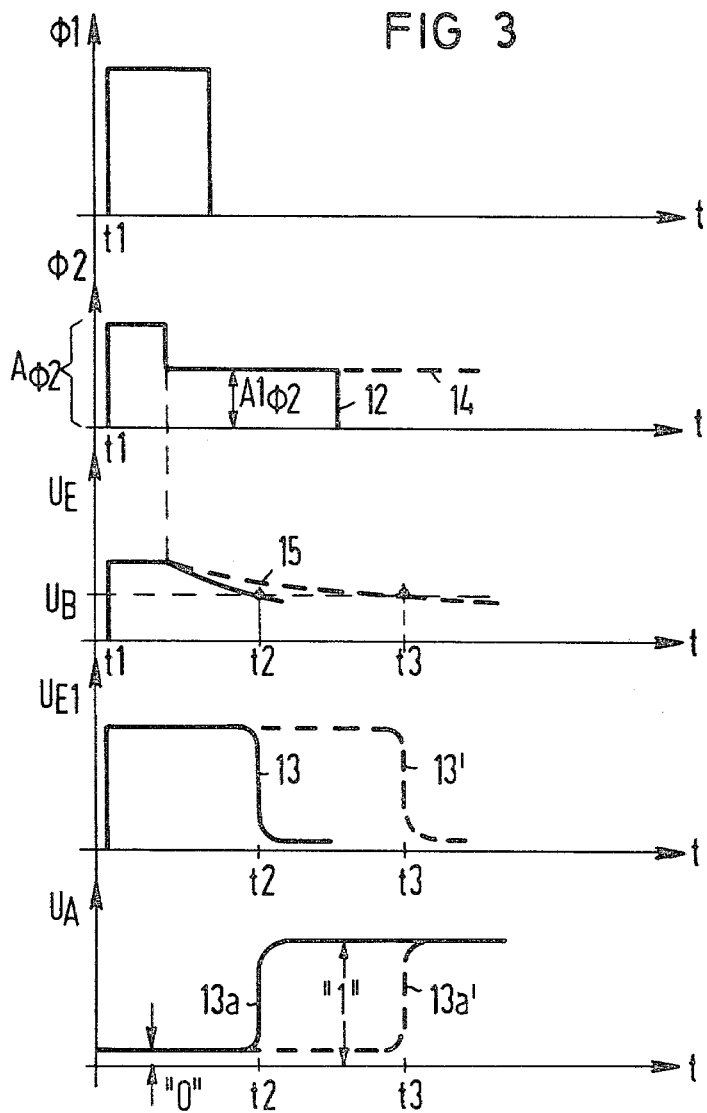
FIG. 3 shows voltage-time diagrams for explaining operation of FIGS. 1 and 2.

If now the photodiode is exposed through the aperture of a stop 35 with light beams L1, then the voltage $U_E$ (FIG. 3) and the potential P6 (FIG. 2) decrease. In the course of a predetermined integration time, the end of which is determined by the backward trailing edge 12 of $\phi 2$, the potential P6 can attain the potential barrier P71 in the case of sufficiently strong exposure (time t2). In FIG. 3, this time is determined such that $U_E$ has attained a threshold value $U_B$. Following this, a part of the charge of the photodiode FD flows via P71 into region 9 and lowers P9 to a value P91, whereby voltage $U_{E1}$ drops off strongly, as indicated in FIG. 3 with 13. The cutoff voltage of T2 is set such that it is attained by means of this voltage drop 13 of UE1. This has the result that T2 blocks and in the fact that the voltage $U_A$ at output A is switched over from the logic signal "0," which was present after the resetting and which corresponds approximately to the reference potential, to the logic signal "1" which corresponds approximately to the voltage $U_{DD}$. If on the other hand within the predetermined integration time, because of a weak exposure of FD the potential barrier P71 is not attained by the potential P6, then this inverter switch-over does not occur. With this, a logic evaluation of the analog sensor signal corresponding to voltage $U_E$ at the end of the integration time (12) is provided by the digital output signals "1" and "0."

According to a variance from the manner of operation specified above, the pulse $\phi 2$ is not disconnected, so that in FIG. 3 the broken line 14 takes the place of flank 12. A time span t1 to t3 is determined, after which, even in the case of a weaker exposure (curve 15 in FIG. 3), the voltage $U_E$ has attained the threshold value $U_B$, or respectively, the potential P6 has attained the potential barrier P71. The voltage drop of $U_{E1}$ (compare 13') and the switchover of the voltage $U_A$ from "0" to "1" (compare 13a') then occur at time t3. Thus the time span t1 to t3 is a measurement for the strength of exposure of the photodiode FD. The voltage $U_A$ with the voltage rise 13a' can bring about, in the case of other similarly constructed analog-digital converters, an ending of the integration time, which can occur by means of a disconnection of the clock pulse $\phi 2$. In this case, this photodiode FD of the converter under consideration is preferably designed longitudinally extended such that it lies near a plurality of sensor elements which are associated to the other converters and thus takes on an optically generated charge which corresponds to the mean value of the exposure of all of these sensor elements. The time span t1 to t3 thereby corresponds to an integration time, within which a part of the further converters which are post-connected to more strongly exposed sensor elements are switched over to the output signal "1," whereas the remaining part of these converters which are associated to less strongly exposed sensor elements, are not switched over and further release the output signal "0."

By means of a large capacitance $C_{SE}$ of the sensor element SE in comparison to the input capacitance $C_{E1}$ of the inverter T2, L, a change in potential from P9 to P91 which is relatively large is attained, so that the cutoff voltage $U_T$ of T2 is attained reliably even in the case of larger tolerances which are conditioned by the manufacture during the voltage drop 13.

Figure 4:
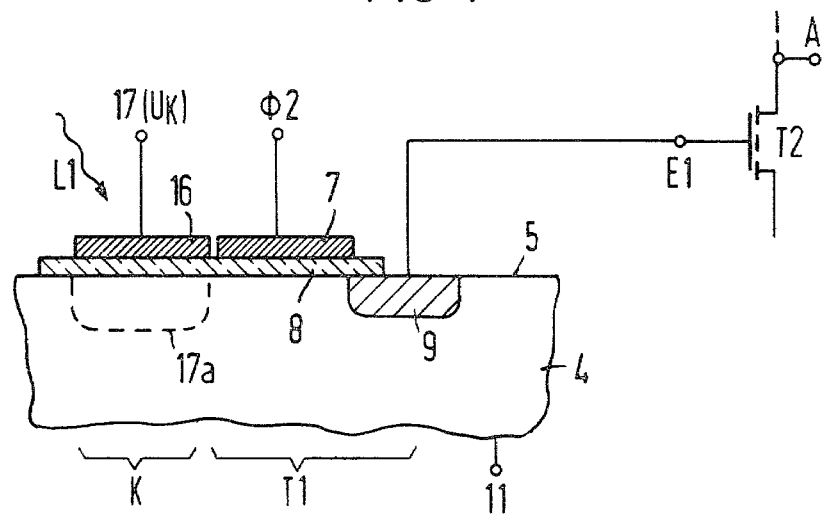
FIG. 4 shows an alternative embodiment for the circuit of FIG. 2.

According to another design of the analog-digital converter, the sensor element SE consists of MIS capacitor K which is represented in FIG. 4. This has a gate electrode 16 which is separated from the interface 5 of the semiconductor body 4 by means of the thin insulating layer 8. It is provided with a lead 17, which is connected with a constant voltage $U_K$. Under the influence of $U_K$, a space charge zone which is indicated with 17a forms under the gate electrode 16. The remaining circuit parts of FIG. 4 correspond to the circuit parts of FIG. 3 which are provided with the same reference symbols. The voltage $U_K$ must be selected such that a surface potential $\phi_S$ forms under the gate electrode 16. This surface potential approaches the potential value P6 (FIG. 2) or exceeds it. The use of an MIS capacitor K as sensor element brings with it the advantage of a large capacitance $C_{SE}$.

Figure 5:
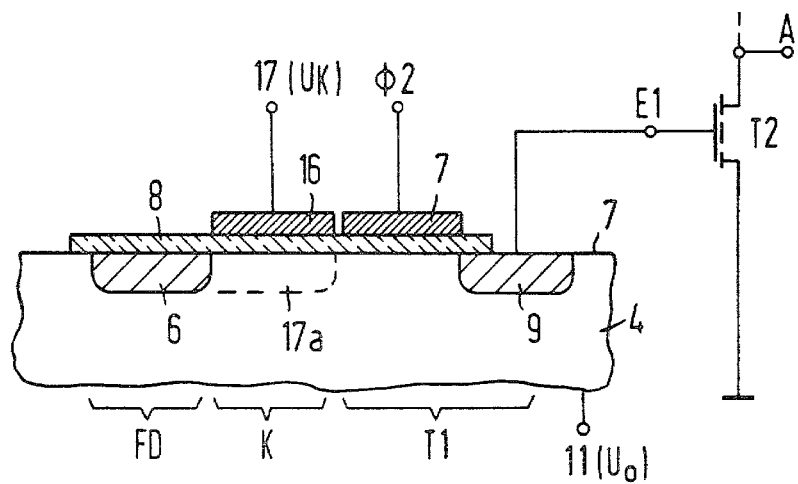
FIG. 5 shows a second embodiment of the circuit of FIG. 2.

FIG. 5 shows a further design of the analog digital converter, whereby a photodiode FD according to FIG. 2 and a MIS capacitor K according to FIG. 4 are arranged next to one another on the thin insulating layer 8 and together form the sensor element SE. The circuit parts explained already with the use of FIGS. 2 and 4 are provided in FIG. 5 with the same reference symbols. The capacitance $C_{SE}$ is even greater according to FIG. 5 than according to FIG. 4.

The load element L can also consist of a field effect transistor of the depletion type. Its gate is then connected with the circuit point 2, in contrast to FIG. 1. Besides this, the gate of the field effect transistor which forms the load element L can be connected with a control line independently of its type. This control line is at a set potential or at a clock pulse voltage.

The circuit of the analog digital transducer according to the invention is at least partially monolithically integrated upon a doped semiconductor body with special advantage. In the case of a circuit construction in n-channel MOS engineering, the potential and voltages related to the substrate voltage $U_0$ are provided with a positive sign. In the case of p-channel MOS engineering, the voltages and potentials display negative signs, whereby also the conductivity types of the doped semiconductor regions are to be replaced by the opposing ones in each case.

FIG. 6 shows an advantageous use of an analog-digital converter according to the invention. This corresponds to the circuit portion designated W, which is connected to the output E of a sensor element SE11, for example, of a photodiode. The output A of the converter is connected via a transfer transistor T4, the gate of which is connected with a clock pulse voltage $\phi_3$ and a drain or source with the input of a stage or step 21 of a shift register 20. The same kinds of sensor elements SE12 ... SE1n and SE21 ... SE2n are connected via the same kind of converters and transfer transistors with the stages 22 ... 2n of the shift register 20 and the stages 21 ... 3n of a shift register 30. The clock pulse inputs of the dynamic shift registers 20 and 30, which for example are designed in two-phase fashion, are provided with two clock pulse voltages $\phi_{20}$, $\phi_{21}$, which for reasons of simple representation are supplied via a line 40 which is drawn in with one pole. In series with the clock pulse inputs of the shift register 30 is a gate circuit 41, which displays a second output 42 connected via a line 43 with a counter 60. The outputs 20a and 30a of the steps 2n and 3n are on the one side connected via lines 20b and 30b with the inputs of the steps 21, or respectively, 31, and on the other side are connected with the inputs 51 and 52 of a circuit 50, which determines the coincidence or lack of coincidence of the signals supplied to it via 20a and 30a. In a practical manner, the circuit 50 consists of an exclusive OR gate. The output of 50 is connected with a counter 54. Its output is connected via a memory 54a with the first input of a digital comparator 55, the second input of which is connected to a memory 56. On the other side, the output of the counter is connected with the memory 56 via an electronic switch 57 which is controlled via the output of the comparator 55. The output of the comparator 55 also influences the control input of an electronic switch 61, via which the output of the counter 60 is connected with a memory 62. An output 63 of the latter is finally connected with a device 64. The circuit parts 50 through 57 and 60 through 63 represent an evaluating circuit 70.

The sensor elements SE11 ... SE1n, which together form a linear image sensor S1, and the sensor elements SE21 ... SE2n, which together form a second linear image sensor S2, are exposed through the apertures of a stop with light beams L1, or respectively L2, which are derived separately from an object, the distance of which is to be determined. The separate images of this object on the planes of S1 and S2 are in such a surface related association to the image sensors S1 and S2 that these are directed at lines of the images that correspond to one another. For a predetermined distance of the object, for example, for the distance "infinite," S1 and S2 display the same brightness curves over the entire length of the sensor lines, so that at the outputs A, digitalized sensor signals S1n ... S11 and S2n ... S21 which are present in the case of a serial read-out in the sequence of the sensor elements, produce signal sequences which display a maximum correlation. If the distance of the object changes, then the segments of the lines which correspond to one another and which are directed to S1 and S2, are displaced. Accordingly, the correlation between the signal sequences mentioned become smaller. If one displaces the serially read-out digitalized signal sequences S1n ... S11 and S2n ... S21 in a step-like manner with respect to one another, then one can determine the displacement whereby the greatest correlation again occurs. This displacement is then a measurement for the actual distance of the object.

The shift registers 20 and 30 serve for the serial read-out of the sensor signals S1n ... S11 and S2n ... S21. In these shift registers the sensor signals in each case circulate under the influence of the clock pulse voltages $\phi_{20}$, $\phi_{21}$. After n clock pulse periods of $\phi_{20}$ which belong to a first read-out cycle, in each case a complete signal cycle has occured so that the signal S1n which was present at the beginning of this cycle at the output 20a is again present at 20a also at the end of the same. Analogously to this, the signal S2n is present at the output 30a at the beginning and at the end of the first read-out cycle. The gate circuit 41 is blocked after this first read-out cycle for the duration of a clock pulse period $\phi_{20}$, $\phi_{21}$, so that the shift register 20 is connected further by one step, while 30 remains in the switching state which was attained at the end of the first cycle. For a second read-out cycle which follows the last named clock pulse period, the blocking of the gate circuit 41 signifies that one begins from a new mutual association of the sensor signals which are read-out serially at 20a and 30a, whereby the signals $S1(n-1)$ and S2n, $S1(n-2)$ and $S2(n-1)$ and so on appear simultaneously at 20a and 30a. The second read-out cycle thus runs with a mutual displacement of the sensor signal sequences by one signal width. Each further read out cycle begins with a displacement of the sensor signal sequences with respect to one another which is increased in each case by one signal width. The circuit 50 releases a pulse for each coincidence of the logic signals "1" and/or the logic signals "0," which occur during a complete signal cycle in the shift registers 20 and 30, that is, during a complete read-out cycle. The counter 54 which is reset to 0 before the beginning of each read-out cycle, counts the number of these coincidences per cycle. If during a read out cycle in 54 a higher counter result is attained than in the preceding read out cycles, then a control signal is released via the comparator 55. This control signal in each case connects the gate circuit 57 and, via the line 58, the gate circuit 61 to be conducting.

In the case of each clock pulse period which is suppressed in the gate circuit 41, via 42 a count pulse P1, P2 and so on is derived which is supplied via the line 43 to the counter 60. By means of the function of the gate circuit 61, then, in each case with the occurence of a new count of the counter in the counter 50 which is larger than the largest count of the counter up until then, the momentary count of the counter is transferred from the counter 60 into the memory 62. This momentary count of the counter corresponds to the number of the count pulses P1, P2 ... which has occured all together up to this point in time and thus corresponds to the number of the relative displacements which have occurred up until then of the signal sequences S1n ... S11 and S2n ... S21. After n read-out cycles, then a digital signal is stored in the memory 62. This signal corresponds to the number of the relative displacements between the signal sequences, by means of which a maximum correlation between the same is attained. This digital signal is supplied via the output 63 to the device 64 which can consist of an indicating device which displays the distance of the object. On the other hand, the device 64 can also consist of an adjustment device which, in dependence upon the signal supplied via the output 63, adjusts a lens system to such a distance with respect to a focal plane that an image of the object which is obtained via the lens system is focused onto the focal plane. Circuits of this kind can be employed above all in photographic or electronic cameras.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. Analog-digital converter system which evaluates an analog signal of an optoelectronic sensor element, comprising: an optoelectronic sensor element; an inverter having a switching transistor and series connected load element; a transistor connecting the sensor element with an input of the inverter; the inverter input being connected with a source lead of a reset transistor whose drain lead is at a constant voltage; and the transistor connecting the sensor element with the inverter input being designed as a potential barrier defining transistor.

2. Analog-digital converter system according to claim 1 wherein the sensor element is designed as a photodiode.

3. Analog-digital converter system according to claim 1 wherein the sensor element is designed as an MIS (Metal-Insulator-Semiconductor) capacitor.

4. Analog-digital converter system according to claim 1 wherein the sensor element comprises a photodiode and a MIS (Metal-Insulator-Semiconductor) capacitor.

5. Analog-digital converter system according to claim 1 wherein a capacitance of the sensor element is selected to be larger than an input capacitance of the inverter.

6. Analog-digital converter system according to claim 1 wherein the load element comprises a field effect transistor and the gate of which is connected to control voltage.

7. Analog-digital converter system according to claim 1 wherein the load element comprises a field effect transistor having one of its source and drain leads connected to its gate lead.

8. Analog-digital converter system according to claim 1 wherein at least a portion is monolithically integrated on a doped semiconductor body.

9. A method for the operation of an analog-digital converter system having an optoelectronic sensor element, an inverter with a switching transistor and series-connected load element, a potential barrier defining transistor connecting the sensor element with an input of the inverter, and a reset transistor connecting a constant voltage to the inverter input, comprising the steps of: resetting the inverter input and the sensor element to a high potential by means of supplying of a clock pulse to a gate of the reset transistor; supplying a pulse voltage to a gate of the potential barrier defining transistor; thereafter lowering said pulse voltage such that below the gate of the potential barrier defining transistor a potential barrier arises which is adjustable by means of said pulse voltage; disconnecting said clock pulse and drawing optically generated charge carriers collected after the disconnection of the clock pulse in the sensor element after overcoming said potential barrier so as to switchover the inverter.

10. A method according to claim 9 wherein said pulse voltage is disconnected at a predetermined point in time, so that the potential barrier defining transistor blocks at this point in time.

11. An analog-digital converter system according to claim 1 wherein a plurality of said sensor elements are grouped in two linear image sensors provided for distance measurement, analog output signals of the sensor elements being digitalized in a plurality of analog-digital converters formed of said inverter, potential barrier defining transistor, and reset transistor and are supplied to an evaluating circuit means for evaluating output signals of both image sensors as to their correlation so as to measure distance.

12. An analog-digital converter system which evaluates an analog signal of an optoelectronic sensor element, comprising: an inverter having a switching transistor and series connected load element; a transistor designed as a potential barrier defining transistor connecting the optoelectronic sensor element with an input of the inverter; a reset transistor which connects the inverter input to a constant voltage, a control voltage being applied to control the reset transistor.

* * * * *